United States Patent [19]

Swisher

[11] Patent Number: 4,522,347

[45] Date of Patent: Jun. 11, 1985

[54] DRAG ADJUSTMENT CLICK SPRING ASSEMBLY

[75] Inventor: Steven L. Swisher, Tulsa, Okla.

[73] Assignee: Brunswick Corporation, Skokie, Ill.

[21] Appl. No.: 539,314

[22] Filed: Oct. 5, 1983

[51] Int. Cl.³ .............................................. A01K 89/00
[52] U.S. Cl. ................................... 242/84.5 A; 74/527
[58] Field of Search .................... 242/84.5 A, 84.51 A, 242/84.51 R, 84.2 A, 84.5 R; 74/527

[56] References Cited

U.S. PATENT DOCUMENTS

| | | | |
|---|---|---|---|
| 1,337,857 | 4/1920 | Thorpe | 242/84.5 R |
| 2,724,563 | 11/1955 | Shakespeare et al. | 242/84.5 A X |
| 3,023,978 | 3/1962 | Denison et al. | 242/84.2 A X |
| 3,120,357 | 2/1964 | Wood | 242/84.5 A |
| 3,697,011 | 10/1972 | Christensen et al. | 242/84.2 A X |

Primary Examiner—Stuart S. Levy
Assistant Examiner—Katherine Jaekel
Attorney, Agent, or Firm—Wood, Dalton, Phillips, Mason & Rowe

[57] ABSTRACT

A spring member for cooperative engagement with a rotatable drag adjustment wheel. The spring is anchored with the deck plate and has an associated, resilient arm for engagement with notches on the drag wheel. The spring inhibits rotation of the wheel to resist adjustment thereof and interacts with the notches to produce an audible click to remind the user to movement of the wheel.

14 Claims, 9 Drawing Figures

DRAG ADJUSTMENT CLICK SPRING ASSEMBLY

TECHNICAL FIELD

This invention relates to fishing reels and, more particularly, relates to a structure for producing audible sound when drag pressure is adjusted and for preventing inadvertent adjustment of the drag pressure.

BACKGROUND OF THE INVENTION

In conventional spin cast reels, drag braking is typically accomplished by developing friction between a drag washer and a face of a line-carrying spool. Drag pressure is increased by applying a force against the drag plate which is in substantially face-to-face contact with the spool. In one such arrangement a drag wheel is suspended within the reel housing for rotation about a longitudinal axis. The drag wheel is confined against longitudinal shifting and is threadably engaged with a longitudinal screw. Rotation of the drag wheel causes longitudinal advancement or retraction of the screw depending upon the direction of rotation of the wheel. The screw, which abuts the drag plate, increases or decreases the pressure between the drag plate and spool.

Generally, to position the wheel accessibly, the wheel is situated so as to protrude partially at the upper and outer surfaces of the housing. During use, the wheel is often bumped or otherwise inadvertently rotated, thereby varying the drag. Particularly at low drag settings, the drag wheel is easily movable. At high drag settings this problem is not as prevalent in that the threads on the screw are biased against the threads on the confined drag wheel by the force applied to the drag plate. While there is less of a tendency of the wheel to rotate at high drag settings, even slight rotation of the drag wheel that might occur is detrimental. The result in either event is that the drag varies from the chosen pressure, which can only be detected during retrieval of a fish, at which point it is impractical and may be too late to make any adjustment.

The present invention is directed to overcoming the above-described problem.

DISCLOSURE OF INVENTION

This invention relates to spinning style fishing reels, particularly to the type having a line carrying spool with a friction creating member engageable therewith. A screw member engages the friction creating member and is advanced selectively fore and aft by rotation of a drag wheel which is threadably engaged therewith.

It is the principal object of the present invention to provide a structure that will inhibit movement of the drag wheel to prevent inadvertent drag adjustment and that at the same time will alert the user to any rotation of the drag wheel.

According to the invention, the drag wheel is provided with a plurality of notches arranged for interaction with a spring member. The spring member has a flexible, resilient leg which traverses the notches as the drag wheel is rotated. The engagement between the spring and notches inhibits rotation of the wheel and produces an audible clicking sound that alerts the user to movement of the drag wheel. In a preferred form the drag wheel is fabricated from a lightweight material so that the user will not only hear but also will sense the vibration caused by the spring leg engaging within the notches.

It is another object to provide a structure that can be readily assembled with the reel.

A mounting post may be formed integrally with the deck plate. In a preferred form the spring comprises a formed flexible, resilient wire, with a plurality of coils which are situated about the mounting post. Thus the spring need only be forced over the mounting post to effect assembly. In this embodiment the wire extends away from the post, defining the leg engaging the notches.

Alternatively, a sleeve embraces a shaped post and is provided with a flexible leg integrally formed therewith. The sleeve closely surrounds the shaped post and is assembled likewise by a simple slip-fit operation.

DESCRIPTION OF THE BASIC STRUCTURE AND OPERATION OF THE FISHING REEL

Figure 1:
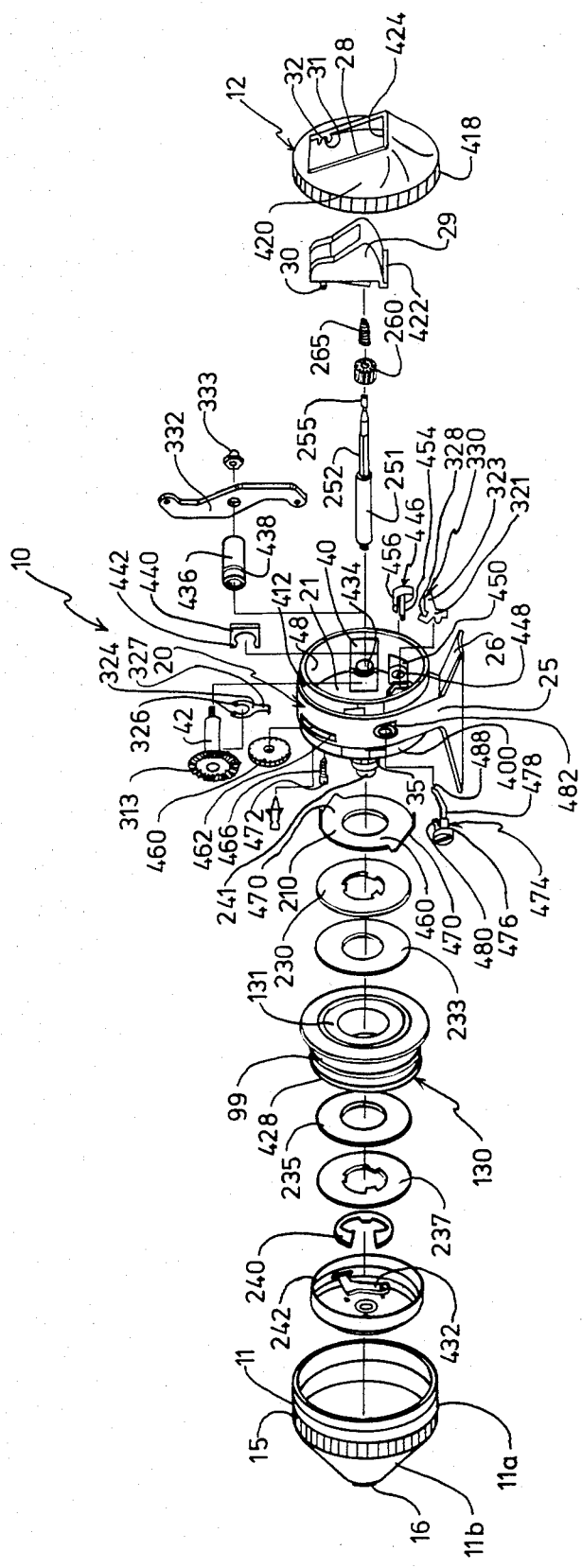
FIG. 1 is an exploded view of a reel embodying the invention.

Referring initially to FIG. 1, there is shown a reel 10 including a closed face housing having a reel body 20 to which is attached a front cup-shaped cover 11 and a rear cup-shaped cover 12. The front cover 11 has a cylindrically shaped first part 11a closely surrounding a forwardly opening annular rim 400 on the reel body 20. The front cover tapers radially forwardly from the cylindrical first part 11a to define a cone-shaped second part 11b. A circular line opening is provided in the conical second part 11b and mounts an annular line guide 16 in a conventional manner.

The front cover 11 is removably attached with the reel body 20 in a conventional manner. To facilitate grasping and rotation of the front cover 11 during assembly, a knurled gripping portion 15 is defined on the external surface of the cover 11. The rear cover 12 is removably attachable in a conventional manner with a rearwardly opening rim 412 associated with the back of the reel body 20. A knurled portion 418 is provided on the external surface of the cover 12 to facilitate assembly.

The rear cover 12 has a sloped wall 420 defining a rectangular opening 28 for reception of a one-piece thumb button 29. The thumb button has a shape substantially mating with the shape of the opening 28 in the rear cover 12 and has a pair of sidewardly extending pivots 30 on the upper forward side edges thereof which engage in pivot openings 31 formed in the adjacent side walls 32 of the opening 28. A lip 422 extends laterally along the bottom edge of the thumb button 29. With the thumb button assembled from the inside of the cover 12, the pivots 30 are introduced to the slotted openings 31 in the walls 32 of the rear cover. The lip 422 abuts the edge 424 of the wall defining the bottom of the rectangular opening 28 to prevent the thumb button 29 from pivoting rearwardly out of the opening 28 in the rear cover 12.

The reel body 20 includes a transverse mounting plate or deck plate 21 and has an integrally molded, radially extending stem 25 with a mounting foot 26 on the outer end thereof for attachment to the appropriate part of a fishing rod (not shown).

A central hub 35 is formed with and projects forwardly of the deck plate 21 and receives in succession a drag plate 210, back spool washer 230, back flat drag washer 233, spool assembly 130, front flat drag washer 235, front spool washer 237, all of which are retained on the hub 35 by means of a spool retainer clip 240 which fits into a groove aligned with a shoulder separating the hub 35 from a reduced diameter and cam supporting front portion 241.

A centershaft 251 is slidably and rotatably mounted in a bore extending through the deck plate 21 and hub 35, with a spinner head assembly 242 threaded onto the forward threaded end of the shaft 251. The spinner head assembly 242 partially surrounds the forward flange 428 of the spool assembly 130 with a supply of fishing line 99 being wound on a spool 131 of the spool assembly 130. A pinion gear 260 is splined on a reduced diameter splined portion 252 of the centershaft 251 and is resiliently maintained in a forward position against the deck plate 21 by a centershaft spring 265 bearing against a stop 255 on the centershaft. The splined connection between the pinion gear 260 and centershaft 251 permits the axial sliding motion of the shaft 251 relative to the pinion gear 260 while at the same time rotation of the pinion gear 260 will rotate the centershaft 251.

Depressing the thumb button 29 moves the centershaft 251 and spinner head assembly 242 forward relative to the hub 35 to retract a pickup pin mechanism 432, mounted on spinner head assembly 242. Manipulating the thumb button in a conventional manner will provide a braking action to the line, will permit casting of the line or will permit retrieving the line onto the spool.

The deck plate 21 has a rearwardly projecting boss 40 with a laterally directed bore 434 for reception, in a concentric manner, of a crankshaft 42, surrounded by a cylindrical sleeve bearing 436. The bearing 436 has an annular groove 438 which, with the bearing properly aligned on the reel body 20 is in planar alignment with a slot defined at the rear of the deck plate 21 within a radially inward extension of the boss. A clip 440 surrounds the sleeve bearing 436 and resides within the groove 438, with forwardly projecting legs 442 of the clip 440 entering the slot in the deck plate 21. This arrangement assures proper positioning of the sleeve bearing 436 and prevents any lateral shifting thereof.

The crankshaft 42, with a main pinion gear 313 attached at one end is rotated in the sleeve bearing 436 in the bore 40 and has a handle 332 attached by means of a nut 333 to the other end of said crankshaft 42. The gear 313 meshes with the pinion gear 260 on the centershaft 251 so that rotation of the crank handle 332 will rotate the centershaft 251 and spinner head assembly 242.

An anti-reverse assembly 330, which is associated with the crankshaft 42, includes a ratchet (not shown in FIG. 1) fixed on the back of the gear 313 for rotation with the gear 313 and crankshaft 42. The anti-reverse assembly 330 includes a pivotable pawl 321, a pawl actuator 324 and a control member 446. The pawl actuator 324 has a pair of bifurcated legs 326 which grip the surface of the crankshaft 42 with sufficient force that the pawl actuator 324 will rotate with the crankshaft 42, but will slide relative to the crankshaft 42 when the gripping force is exceeded. An actuator tab 327 extends transverse to the plane of the pawl actuator 324 and engages in a recess 328 in the pawl 321. The pawl 321 will be situated with the pawl tooth 323 selectively aligned with the ratchet.

Independent, manual control of the pawl 321 is accomplished by the separate control member 446 mounted within a lateral bore 448 in a boss 450 spaced beneath the boss 40. The control member 446 is manipulable externally of the reel body. Clockwise rotation of the control member 446, as viewed in FIG. 1, will pivot the pawl about the pivot tab 322 out of engagement with the ratchet. Thus movement of the crank handle 332 in either a clockwise or counterclockwise direction by the user, with the pawl 321 manually disengaged by the control member 446, will not effect movement of the pawl 321 and thus clockwise and counterclockwise crankshaft rotation will be uninhibited by the pawl 321.

Counterclockwise rotation of the control member 446 will allow the pawl 321 to be moved freely between two limiting positions so that rotation of the crank handle 332 in a counterclockwise direction, as viewed in FIG. 1, will pivot the pawl out of alignment with the teeth of the ratchet, whereupon the crank handle 323 will be permitted to be rotated in that direction without interference. In addition, with the control member 446 in the counterclockwise position, rotation of the handle 332 in the clockwise direction moves the pawl actuator 324 in the clockwise direction with the tab 327 pivoting the pawl 321 in a counterclockwise direction to move the pawl into the path of the ratchet teeth to stop further rotation of the crankshaft 42 and handle 332 in that direction.

Drag actuation is effected by a knurled drag wheel 460 which is captured in and protrudes through a slot 462 beyond the outer surface of the reel body 20. The wheel 460 has a threaded bore and is suspended for rotation by a longitudinally directed bolt 466 extending through the spaced walls flanking the wheel 460.

The drag washer 210 has a substantially flat body 468 and has diametrically opposed tabs 470 bent perpendicularly in a common direction out of the plane of the body 468. The deck plate 21 has locating apertures for receiving each of the tabs 470. The one aperture is in direct alignment with the bolt 466 suspending the drag wheel 460. The forward end 472 of the bolt is slotted and is accessible through the one aperture to receive the one tab 470 of the drag plate 210.

This arrangement of the drag plate 210 prohibits rotation of the bolt 466 as the drag wheel 460 is manipulated. As a result, rotation of the drag wheel effects fore or aft movement of the bolt 466 relative to the reel body 20. Rotation of the wheel in a first direction forces the tab 470 and drag washer forwardly increasing drag braking pressure on the spool 131. Retraction of the bolt 466 and reduction of the braking pressure is accomplished by rotation of the drag wheel 460 oppositely to the first direction.

The reel is provided with a bait clicker 474 seated in boss 482 and is manipulable by the user between engaged and unengaged positions, with silent reel operation occurring with the clicker 474 in the latter position. The bait clicker 474 consists of a body portion 476 having a bifurcated end with long and short legs, respectively 478, 480.

Leg 478 is of a flexible construction and extends into engagement with the pinion gear 260. The end 488 of the clicker 474 rides over the teeth on the pinion gear 260 as the centershaft 251 is rotated and produces a clicking sound that is audible through the reel housing. The leg 478 will deform upon reverse rotation of the centershaft 251 (line retrieval) and will align to provide a softer clicking sound as occurs during forward rotation of the centershaft.

DESCRIPTION OF THE PREFERRED EMBODIMENT

As detailed in FIGS. 1-4, drag actuation is effected by a drag wheel 460 having a rotational axis in substantially parallel alignment with the crankshaft 251. The wheel 460 is captured between longitudinally spaced, depending walls 600 and protrudes through a rectangular slot 462 slightly beyond the outer surface 602 of the reel body 20. The walls 600 are joined by a longitudinally directed wall portion 601, which in conjunction with the depending walls 600, provides a substantially enclosed shroud about the wheel 460. A pair of aligned apertures 603 are formed through the walls 600 with the wheel 460 having a threaded bore 604 (FIG. 4) aligned with the apertures 603. A threaded bolt 466 passes freely through the apertures 603 and is threaded in bore 604 for suspending the wheel 460 in the shroud.

Drag braking is accomplished by effecting forward movement of the drag plate 210 which applies pressure at the back of the spool 131 through the intermediate back spool washer 230 and flat drag washer 233. The drag plate 210 has diametrically opposed tabs 470 bent generally perpendicularly in a common direction out of the plane of the drag plate 210. The deck plate 21 has locating apertures for receiving each of the tabs 470. The one aperture 603 is in direct alignment with the bolt 466 suspending the drag wheel 460. The forward end 472 of the bolt is slotted at 471 and is accessible through the aperture 603. With the drag plate 210 positioned upon the reel body 20, the one tab 470 will seat closely in the slotted end 471 of the bolt 466.

This arrangement of the drag plate 210 prohibits rotation of the bolt 466 as the drag wheel 460 is manipulated. As a result, rotation of the drag wheel, which is confined longitudinally between the previously described walls 600 on the reel body, effects fore or aft movement of the bolt 466 relative to the reel body 20, depending upon the direction of rotation. Rotation of the wheel in a first direction forces the drag plate 210 forwardly in the vicinity of the tab 470 mating with the bolt 466, thereby increasing drag braking pressure on the spool 131. Retraction of the bolt 466 and reduction of the braking pressure is accomplished by rotation of the drag wheel 460 oppositely to the first direction. The degree of drag braking is then precisely controllable.

A spring member 608 interacts with the peripheral edge 610 of the drag wheel 460 to add resistance to turning the drag wheel 460 and to audibly indicate when turning of the drag wheel takes place. The outer edge 610 of the wheel 460 is provided with uniformly circumferentially spaced, V-shaped notches 612. The notches 612 define an irregular outer surface that facilitates manipulation of the wheel 460 by the user. The notches also interact with the spring 608 as will be described hereinafter.

The spring 608 which is formed from a flexible, resilient wire, is anchored about a cylindrical post 614 extending rearwardly from the back wall of the deck plate 21 at a vertically spaced position from the axis of the bolt 466. The spring 608 is coiled intermediate its length with turns 616 disposed closely about the post 614. Two legs of the spring 608 extend oppositely from the post 614.

A first lower leg 618 of the spring 608 originates from adjacent the base of the post 614 and is trapped between an abutment ramp 621 formed on the deck plate 21 and an anchor lug 623 projecting from the deck plate 21. The opposite leg 624 of the spring 608 departs the post 614 from the rear region thereof just forward of the adjacent surface 625 of the wheel 460 and is directed upwardly and angularly inwardly from the vertical. The end 626 of the leg 624 is offset so as to align axially with the length of the notches 612 in the wheel 460. With the reel viewed from the rear in FIGS. 2 and 3, it can be seen that the spring overlaps with a portion of the wheel 460 and engages the outer edge of wheel 460 at approximately the four o'clock position.

The spring 608 thus applies a constant radial pressure on the wheel in the direction of the bolt 466, thereby reducing the possibility of rattling. The end 626 of the spring 608 binds within the notches 612 to inhibit rotation which, as previously indicated, is most important with a reduced drag setting. Further, an audible click is produced as the end 626 follows the outer edge of the wheel 460. The spring end 626 traverses the outer ridges 628 between the notches 612 and upon encountering the notches 612 is propelled against the wall 630 within each notch by the restoring force in the spring arm 624. Because the wheel 460 is fabricated from a lightweight plastic, the sharp rap of the spring end 626 against the walls 630 within the notch will vibrate the wheel which can be sensed by the user. Thus fine adjustments of the drag can be detected by the user, even should the clicking sound be muffled.

Figure 5:
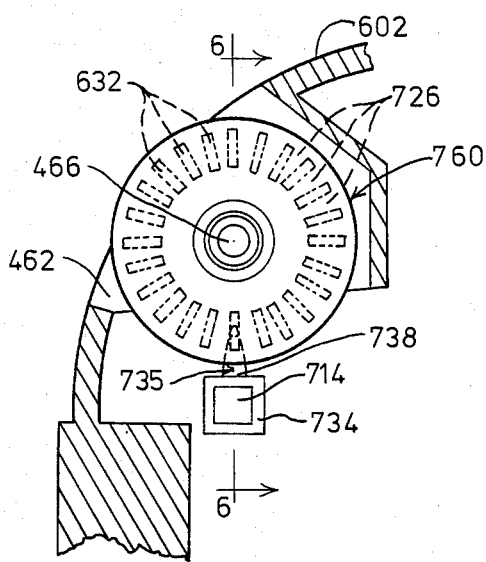
FIG. 5 is a fragmentary, sectional view of the drag actuator assembly incorporating a modified form of the invention.
Figure 6:
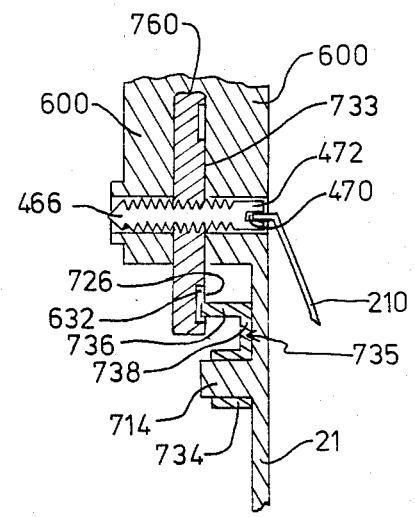
FIG. 6 is a cross-sectional view of the drag actuator assembly taken along line 6—6 of FIG. 5.

A modified embodiment of the invention is shown in FIGS. 5 and 6. The drag wheel 760, rather than being provided with circumferential notches, has radially extending, rectangular notches 632 disposed about the face 733 of the wheel 760.

A rearwardly directed post 714 is integrally formed with the deck plate 21 and has a squared or shaped cross-section. A resilient member 735 is mounted on the post 714 and comprises a sleeve 734 shaped internally to conform with the shape of the post 714 and a resilient arm 736 connected by a connecting arm 738 to the sleeve 734. The sleeve 734 is press fit on the post 714 with the connecting arm 738 seated flushly against the facing wall of the deck plate. In operation the arm 736 is deformed laterally by the ridges 726 between the notches 632 and, as with the wire spring, inhibits rotation of the wheel and alerts the user to rotation of the drag wheel with an audible click.

Figure 7:
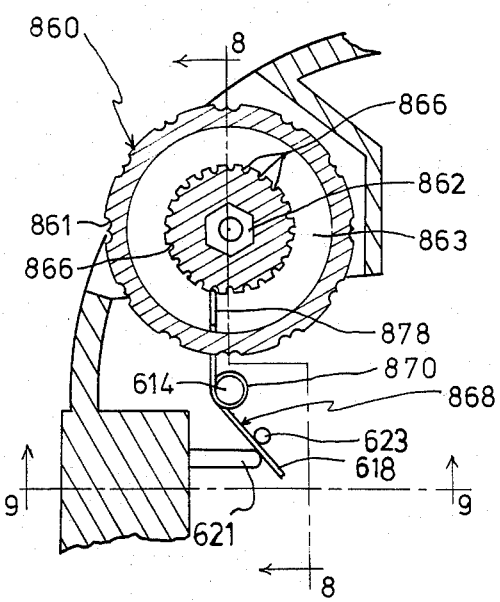
FIG. 7 is a fragmentary, sectional view of a modified form of drag actuator assembly taken along the line 7—7 of FIG. 8.
Figure 8:
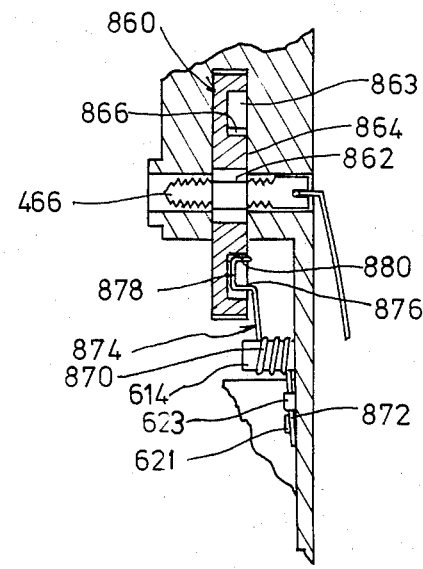
FIG. 8 is a cross-sectional view of the drag actuator assembly taken along line 8—8 of FIG. 7.
Figure 9:
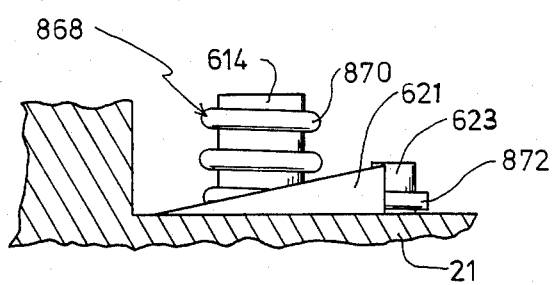
FIG. 9 is a cross-sectional view taken along the line 9—9 of FIG. 7.

Another modified embodiment of the invention is shown in FIGS. 7, 8 and 9 wherein a drag wheel 860 is provided and has a brass or stainless steel hex nut 862 cast or formed at the midportion of the wheel 860. The nut 862 has the female threads engaging with the threads of the bolt 466. The nut being of metal forms a better and longer lasting threaded connection with the threads on the metal bolt 466. The shape of the outer periphery of the nut forms a positive junction with the material of the wheel 860 so that the wheel and nut will rotate with each other. The outer periphery of the wheel has knurling 861 or the like to enhance the purchase on the wheel for turning the wheel. A concentric groove 863 is formed in the rear face 864 of the wheel with a plurality of equally spaced notches 866 formed in the one wall of the groove so as to open radially outward of the hub of the wheel.

Figure 2:
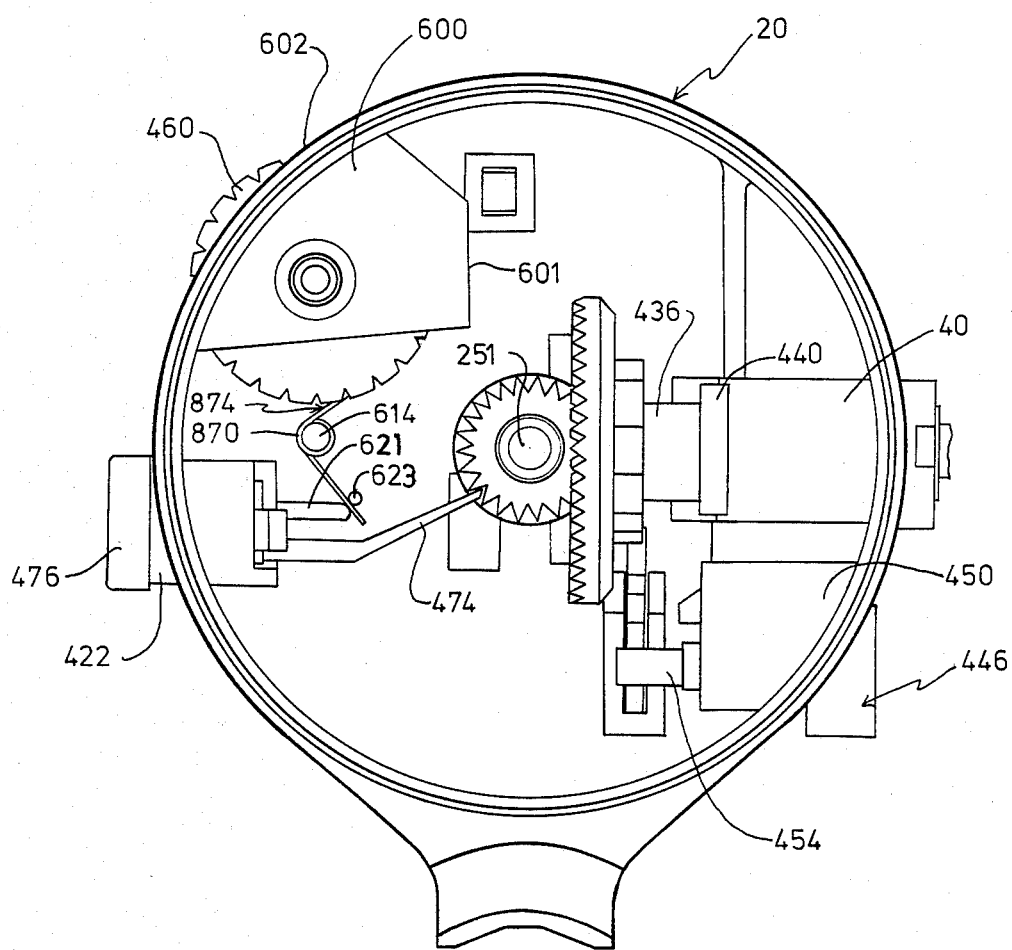
FIG. 2 is a rear, elevation view of a portion of the reel in FIG. 1 with the rear cover removed.
Figure 3:
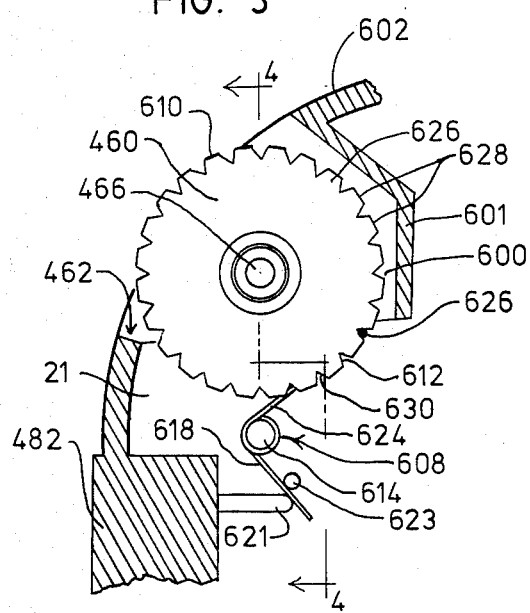
FIG. 3 is a fragmentary, sectional view of the drag actuator assembly incorporating a preferred form of the invention.
Figure 4:
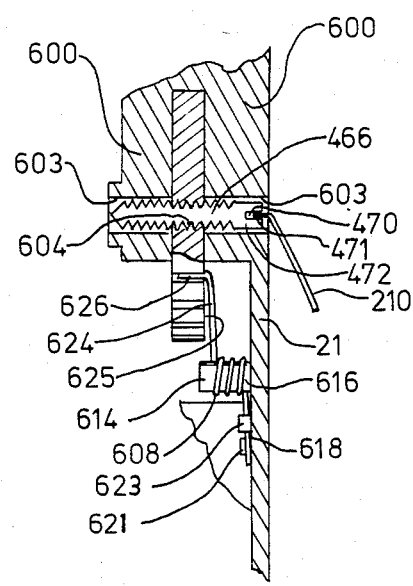
FIG. 4 is a cross-sectional view of the drag actuator assembly taken along line 4—4 of FIG. 3.

A spring 868 formed of flexible resilient wire is anchored by coils 870 about cylindrical post 614 and has its first lower leg 872 trapped between abutment ramp 621 and anchor lug 623 in substantially the same manner as the embodiment shown in FIGS. 2, 3 and 4. The opposite leg 874 of the spring departs the post 614 from the rear region of the post and is directed upwardly from the post. The end portion 870 of the leg 874 is formed into a C-shape out of the plane of the leg 874. The back 878 of the C-shaped end portion 876 is flat and lies in the concentric groove 863 with the upper end 880 of the end portion 876 lying substantially parallel to the notches 866 in the groove 863 in the wheel as the end 880 is seated in one of the notches 866. The spring 868 reduces rattling of the parts and inhibits rotation of the wheel 860. As the wheel 860 is rotated, audible clicking sounds will be generated as the spring end 880 traverses from notch to notch in the wheel. The spring force is such as to create the sharp clicking sounds and to positively retain the wheel in place until moved by force overcoming the spring restraining force.

It should be understood, of course, that the specific forms of the invention illustrated and described herein are intended to be representative only, as certain changes and modifications may be made without departing from the scope of the teachings herein disclosed. Accordingly, reference should be made to the appended claims in ascertaining the full scope of the invention.

I claim:

1. In a fishing reel of the type having a housing, a line carrying spool, a friction creating member positionable against the spool, a drag wheel rotatably mounted within the housing, and means for varying a force applied between the spool and the friction creating member and actuated by rotation of the drag wheel, a structure for indicating and restraining rotation of the drag wheel comprising:
    a plurality of notches on the drag wheel; and
    a spring member having an integral resilient leg engageable with the notches; and
    means mounting the spring member within the housing,
    the resilent leg interacting with the notches to inhibit rotation of the drag wheel and flexing as the drag wheel rotates and being propelled against the drag wheel to produce an audible clicking sound to remind the reel operator of the rotation of the drag wheel.

2. The improved fishing reel of claim 1 wherein the drag wheel is disc-shaped with a circular peripheral edge, and the notches are disposed circumferentially about the peripheral edge of the drag wheel, a portion of said edge protruding from the housing to facilitate rotation of the drag wheel.

3. The improved fishing reel of claim 1 wherein the drag wheel has associated therewith a flat face transverse to the rotational axis of the drag wheel and the notches are disposed on the flat face.

4. The improved fishing reel of claim 1 wherein the drag wheel has a concentric undercut groove in one face thereof, and wherein the notches are disposed in one radially outwardly facing wall of the groove.

5. The improved fishing reel of claim 1 wherein the reel has a deck plate which supports the spool, the drag wheel and the friction creating member, a post projecting from the deck plate, and said means mounting the spring member engages the post to retain the spring member on the post with the resilient leg in operative contact with the notches.

6. The improved fishing reel of claim 2 wherein the spring member is a formed length of flexible, resilient wire and the resilient leg has an offset portion engageable with the notches associated with the drag wheel.

7. The improved fishing reel of claim 5 wherein the means mounting the spring member comprises a sleeve disposed closely and removably over the post and the resilient arm is integrally formed with the sleeve.

8. In a fishing reel of the type having a housing, a line-carrying spool, a friction creating member positionable against the spool, a deck plate upon which the spool and friction creating member are mounted, a drag wheel mounted with the deck plate for rotation about a substantially longitudinally extending axis, means for varying a force applied between the spool and the friction creating member which is actuated by rotation of the drag wheel, and means for indicating and restraining rotation of the drag wheel comprising:
    a plurality of notches on the drag wheel; a
    spring member having a resilient leg engageable with the notches; and
    means for removably slip-fitting the spring member with the reel without the use of separate fasteners, the resilient leg interacting with the notches to restrain rotation of the drag wheel and produce an audible clicking sound to remind the reel operator of the rotation of the drag wheel.

9. The improved fishing reel of claim 8 wherein the deck plate has associated therewith a mounting post and the spring member is a formed, flexible, resilient wire with the means for slip-fitting the spring with the deck plate comprising a plurality of coils disposed closely about the post.

10. The improved fishing reel of claim 8 wherein the deck plate has associated therewith a longitudinal, rearwardly extending post that is non-circular in cross-section with the means for slip-fitting the spring with the deck plate comprising a sleeve which closely surrounds and has a cross-section substantially matching the cross-section of the post, the flexible arm formed integrally with the sleeve and the drag wheel having a rearwardly facing flat surface with the notches formed on the flat face.

11. The improved fishing reel of claim 10 wherein the notches are radially directed from the rotational axis of the drag wheel.

12. The improved fishing reel of claim 9 wherein the drag wheel has a concentric undercut groove defining radially facing spaced side walls, the notches on the drag wheel being formed in one of said radially facing side walls.

13. The improved fishing reel of claim 12 wherein the spring member has an end portion lying parallel to the notches and being resiliently seated in one of said notches.

14. The improved fishing reel of claim 9 wherein the spring member has a second leg interacting with means on the deck plate to load the first named resilient leg into resilient contact with the notches on the drag wheel.

* * * * *